United States Patent [19]

Fitzgerald

[11] Patent Number: 4,576,070
[45] Date of Patent: Mar. 18, 1986

[54] PIPE CUTTER AND METHOD

[76] Inventor: Fitz E. Fitzgerald, 3274 NW. 93rd St., Miami, Fla. 33147

[21] Appl. No.: 169,522

[22] Filed: Jul. 21, 1980

Related U.S. Application Data

[63] Continuation-in-part of Ser. No. 972,529, Dec. 22, 1978, abandoned.

[51] Int. Cl.$^4$ .............................................. B23D 21/14
[52] U.S. Cl. ........................................ 82/82; 82/1.2; 30/103
[58] Field of Search .............. 82/47, 82, 101; 30/103, 30/104; 51/241 A, 241 B, 241 S, 241 VS, 245, 261, 281 R, 281 P; 83/187, 185, 54; 166/55.7, 55.8

[56] References Cited

U.S. PATENT DOCUMENTS

| | | | |
|---|---|---|---|
| 936,263 | 10/1909 | Young | 82/82 |
| 1,007,330 | 10/1911 | Browder | 30/104 |
| 1,088,135 | 2/1914 | Fagan | 82/82 |
| 2,528,043 | 10/1950 | Dolmage | 51/245 |
| 2,659,186 | 11/1953 | Burkholder | 51/245 |
| 3,717,056 | 2/1973 | Gracin et al. | 82/82 |
| 3,783,721 | 1/1974 | Miller | 82/82 |
| 3,810,402 | 5/1974 | Miller | 82/82 |

Primary Examiner—Leonidas Vlachos
Assistant Examiner—Jerry Kearns
Attorney, Agent, or Firm—Jack E. Dominik

[57] ABSTRACT

A pipe cutter having guidance means for cutting a pipe on a plane generally perpendicular to the longitudinal axis of the pipe. A power tool imparts a rotational torque to a shaft having a circular cutting blade carried thereon at substantially right angles thereto. The guidance means, having a pipe contacting surface, is journalled onto the end of the shaft, so that rotation of the shaft and blade will not cause rotation of the guidance means. The method involves aligning the rotating blade at a preselected cutting point, imbedding the blade into the walls of the pipe until an arcuate portion of said walls is cut, and thereafter imparting an orbital motion to the shaft about the pipe axis to achieve the pipe cutting operation.

21 Claims, 6 Drawing Figures

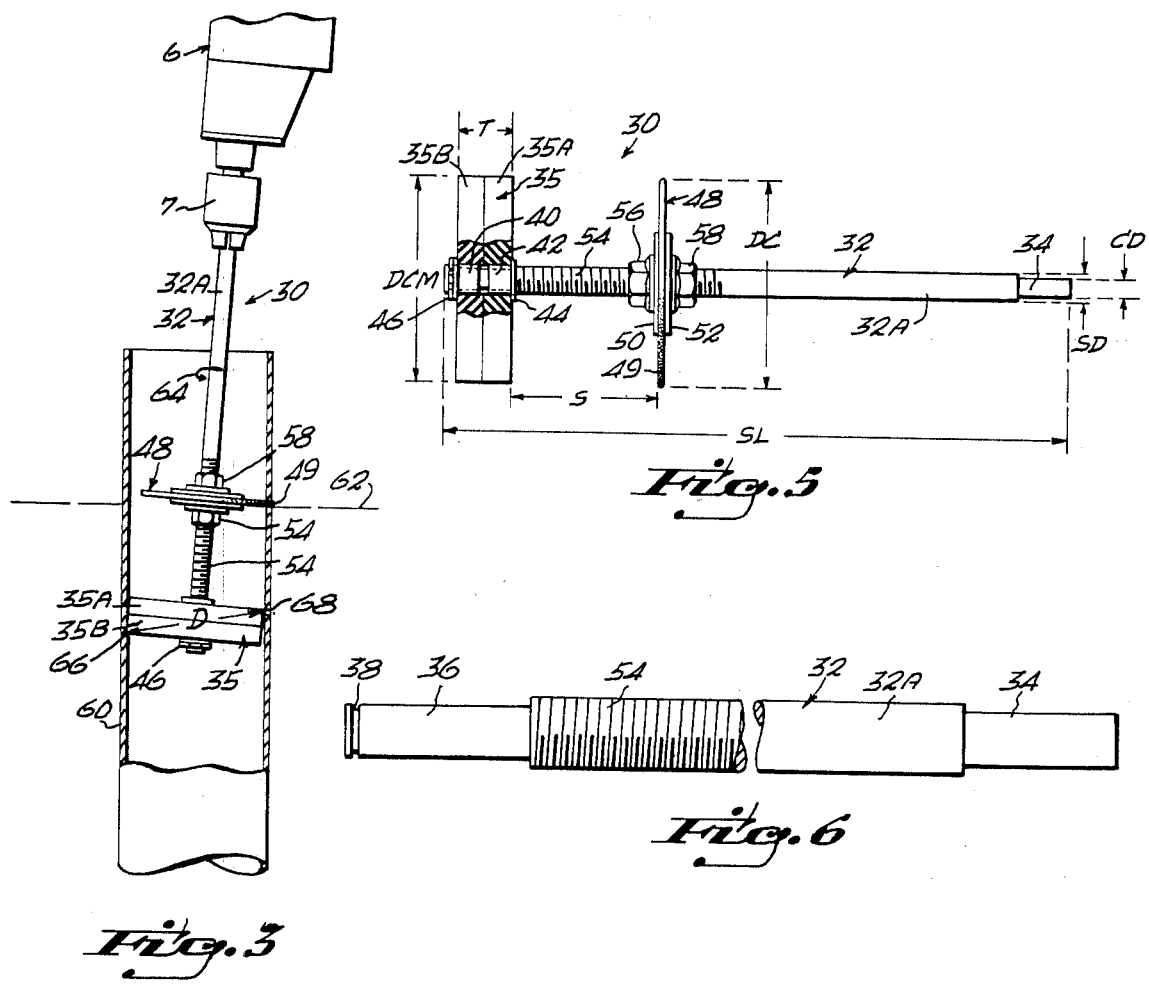
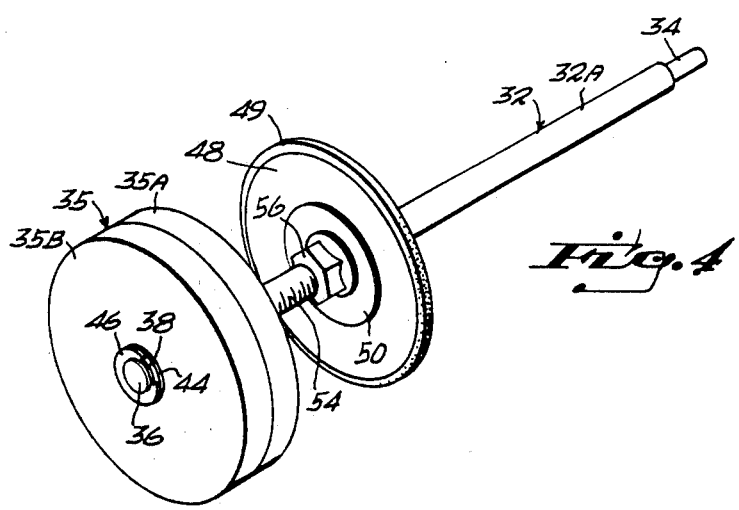

PIPE CUTTER AND METHOD

CROSS-REFERENCE TO RELATED APPLICATION

This application is a continuation-in-part of application Ser. No. 972,529, filed Dec. 22, 1978, now abandoned, for "Pipe Cutter and Method" by the same inventor herein.

BACKGROUND OF THE INVENTION

1. Field of the Invention

This invention relates to pipe cutters, more specifically to pipe cutters adapted to be inserted into the interior of pipes, and more particularly to pipe cutters having a single cutting blade, and further having guidance means to insure that a pipe will be cut on substantially perpendicular to the longitudinal axis of the pipe.

2. Description of the Prior Art

Early attempts to cut pipe involved the mere use of sawing tools. These manual tools require the user thereof to begin sawing a pipe on its exterior surfaces. Considerable difficulty is encountered when hand held saws are used to cut pipes. It is very difficult to make a level cut, it is even more difficult to make such a cut flush with a surface, and it is impossible to make such a cut beneath a surface.

For example, in the art of installing domestic toilets, it is desirable to obtain a level cut on a 4" PVC (polyvinylchloride) pipe, and the cut may need to be flushed with the floor of the room in which the toilet is being installed.

If the pipe leading to the toilet has been installed too close to, or too far from, a wall, it is necessary to connect the said improperly disposed pipe to an offset flange, so that the toilet can be installed in its proper location. When it is necessary to use such an offset flange, the pipe leading to the toilet must be cut below the surface of the floor of the room in which the toilet is being installed. The hand held saws of the prior art are utterly incapable of cutting a pipe below a surface from which the pipe protrudes.

Therefore attempts have been made to provide pipe cutters capable of cutting a pipe below the surface from which it protrudes. One attempt involves the provision of a plurality of cutting blades which are radially mounted about a housing which is lowered into the interior of the pipe. These devices suffer from the fact that their blades often cut different levels of the pipe. In other words, if four cutting blades are provided, the four peripheral cuts often do not coincide. The pipe is eventually cut by the four blades, but the resultant cut is unlevel and mangled.

The earlier devices have used springs to cause the expulsion of the retracted cutting wheels from their housing. These mechanisms are easily worn, unreliable, flimsy and uneconomical to produce.

The known devices possess another serious shortcoming. If access into the interior of a pipe is denied at one end thereof, for example, when a pipe is projecting upwardly from a floor surface, the earlier devices are incapable of cutting off a minimum length of piping. An example of a pipe cutter lacking the ability to cut minimum lengths of pipe in this situation is a pipe cutter model produced by the Breeze Company. In this cutter, the blades must be inserted at least two inches into the interior of the pipes before any projecting length can be removed. Thus, if less than two inches of protruding pipe are desired to be removed, the only known earlier device capable of doing the job is the hand held saw.

SUMMARY OF THE INVENTION

The device exemplary of the present invention comprises a pipe-contacting guidance member rotatably secured at the lowermost end of a shaft. Spaced upwardly of the guidance member and mounted in encircling-engagement with the shaft is a circular cutting blade having a centrally disposed aperture adapted to receive the shaft.

A power tool, such as a drill, imparts a spin to the shaft about its longitudinal axis, thereby causing the revolution of the blade about the axis of the shaft. Tilting the shaft from its axis causes the blade to attack and cut an arcuate portion of a pipe into which the shaft and blade have been inserted. The guidance member, or pipe-contacting member, does not rotate, but causes the blade to cut the pipe on a plane perpendicular to the axis of the pipe when an orbital motion is applied to the shaft.

A disc having rounded edges may be concentrically mounted to a surface, preferably the upper, of the cutting blade to restrain the blade from cutting the material surrounding the pipe. The disc has a diameter less than that of the blade, thereby exposing a sufficient amount of the blade to enable it to completely cut through the pipe.

It is therefore seen to be an object of the invention to provide a pipe cutter having a minimum number of moving parts.

It is a related object to provide a simple-to-construct and therefore economical to manufacture pipe cutter.

It is a very important object of the invention to provide guidance means that permit the user of the pipe to obtain a cut perpendicular to the axis of the pipe.

Yet another important object is to provide a pipe cutter capable of cutting pipes flush with a surface from which they protrude.

Still another object is to provide a pipe cutter capable of cutting pipes beneath a surface from which they protrude.

Yet another object is to provide a pipe cutter capable of cutting minimum lengths of pipe even when access to a pipe is restricted to only one end thereof.

Still another object is to provide blade penetration-limiting means on a pipe cutter, thereby limiting the likelihood that a rotating blade will strike a blade destroying surface surrounding the pipe when the pipe cutting operation is completed.

BRIEF DESCRIPTION OF THE DRAWINGS

FIG. 3 shows a second embodiment of the pipe cutter inserted in a pipe, with the blade positioned to cut the pipe;

FIG. 4 is a perspective of the second embodiment;

FIG. 5 is a partial fragmentary view showing the journalling means of the second embodiment; and FIG. 6 is a view of the shaft in the second embodiment without the cutting blade or contact member attached.

DESCRIPTION OF THE PREFERRED EMBODIMENTS

First Embodiment

Figure 1:
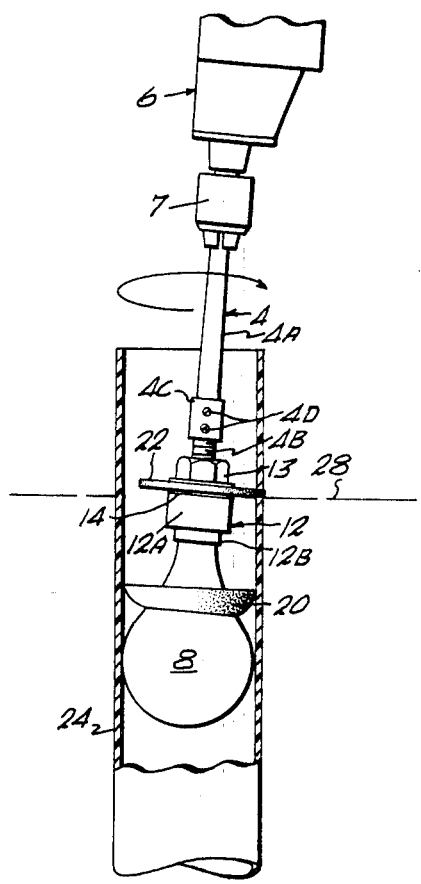
FIG. 1 shows a first embodiment of the pipe cutter inserted in a pipe, with the blade positioned to cut the pipe flush with the floor level.
Figure 2:
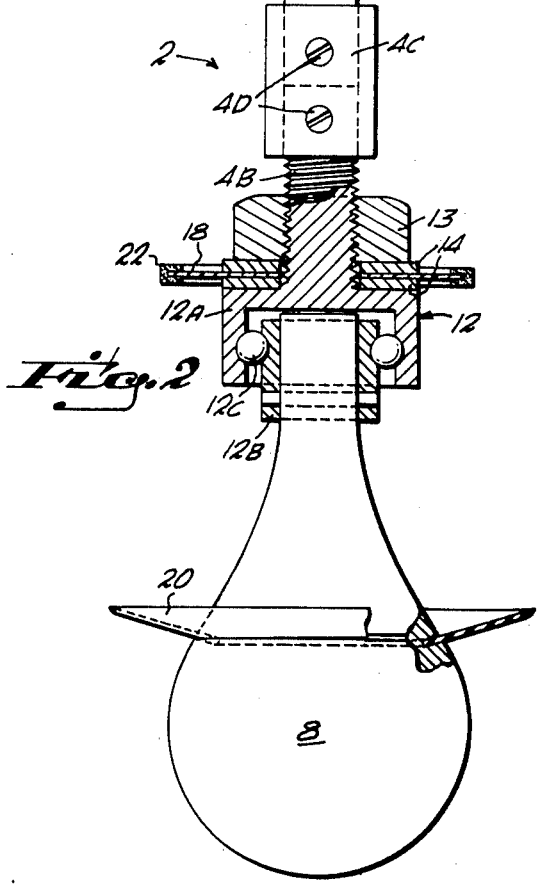
FIG. 2 is a partial fragmentary view showing the journalling means of the first embodiment.

Referring now to the drawings, in FIG. 1 one embodiment exemplary of the present invention is shown.

A pipe 24 is shown projecting upwardly from a floor 28.

For purposes of illustration, it will be assumed that it is desired to cut the pipe 24 flush with the level of the floor 28. As will become more clear as the description proceeds, the invention can cut a pipe at any point.

Inserted into the pipe is the first embodiment, generally designated 2.

An elongate shaft, generally designated 4, is shown divided into a major, unthreaded portion 4a and a minor threaded portion 4b. A sleeve member 4c connects the two, holding the same by means of a pair of set screws 4d.

A pear-shaped pipe contacting member, or guidance member 8, is shown journalled to the lower extremity of the threaded portion of the shaft 4b. This guidance member has a generally spherical pipe contacting lower portion and a slender neck portion.

A swarf-receiving rubber cup 20 is shown mounted about the periphery of the contact member 8.

The pipe contacting member 8 is journalled onto the lower extremity of the threaded portion of the shaft 4b. The journalling means comprises a rotating main portion 12a, a non-rotating minor portion 12b and a ball race 12c disposed therebetween.

The main journalling portion 12 has a shoulder portion for supporting a lock washer 14. A circular cutting blade 18 having a centrally disposed aperture formed therein, is sandwiched between the lock washer supported by the shoulder portion of the main journalling portion 12a and another lock washer held tightly by a nut 13. Thus, tightening of the nut 13 compresses the blade 18 between the lock washers 14.

The reason for the bifurcated structure of the shaft 4 will now be understood. When it is desirable to replace the cutting blade 18, or to invert it, the set screws 4d are loosened so that the unthreaded portion of the shaft 4a and the sleeve member 4c can be removed from the apparatus. This allows for the removal of nut 13, the upper lock washer 14 and the blade 18, without the necessity of having to first retreat nut 13 the entire length of shaft 4 as a condition precedent to the removal of the blade 18. It is clear that an integrally formed shaft having a lower threaded portion would be inoperable, since nut 13 could not be removed in the absence of threading.

Coated on the surface of the blade 18 are tungsten carbide bits 22, or any other suitable abrasive matter. This abrasive matter is provided to prolong the life of the cutting blade 18 should the same contact the environment surrounding the pipe 24.

A hand-held power drill 6 is partially shown having a chuck 7 adapted to receive the shaft 4.

When electric current is supplied to the power drill 6, the shaft 4 and the blade 18 mounted thereon rotate in the known main manner. However, the pipe contacting member 8 will not rotate, because of its journalled relationship to the shaft 4. It is understood that the pipe cutter 2 will operate somewhat effectively even if it is constructed so that the contact member 8 rotates simultaneously with the shaft 4. To construct such an embodiment, a bore is formed within the contact member 8 having internal threads to receive therein in screw threaded engagement the shaft 4 It has been found, however, that rotation of the contact member 8 not only places a higher load on the drill 6, but causes heat-producing friction between the contact member 8 and the pipe 24. Further, the wiping contact between the contact member 8, and the pipe member 24 introduces a degree of instability into the device when in operation.

The method of using the pipe cutter 2 contemplates the introduction of the pipe cutter assembly into the interior of a pipe 24. The blade 18 is aligned with the desired cutting plane and the drill is activated. The shaft 4 is then tilted from the pipe axis. This motion will cause the blade 18 to attack and abrade an arcuate portion of the wall of the pipe 24 until the blade 18 completely cuts therethrough. Having thus accomplished the initial cut, the shaft 4 is then orbited about the pipe axis. This orbital motion is shown by arrow 26. It will be understood that the direction of orbit may depend upon the angular direction of the rotating shaft 4.

The function of the pipe contact member 8 is to hold or stabilize the pipe cutter assembly 2 as the initial cut is made and as the orbital path 26 is followed. As the shaft 4 is tilted from its longitudinal axis to a point on the orbital path 26 to begin the pipe cutting operation, the generally spherical portion of the pear-shaped contact member 8 will make wiping contact with the interior wall of the pipe 24. It will be understood that the contact between the pipe 24 and the pipe contact member 8 will allow the user of the device to firmly press the contact member 8 into that portion of the wall of the pipe 24 opposing that portion of the wall being cut by the blade 18. It is therefore understood that the shaft 4 is elongate not only to increase the distance to which the blade may be inserted into the pipe 24, but to provide leverage as well.

The blade 18, when it is embedded into the pipe 24, acts as a fulcrum of a lever. Thus, when the shaft 4 is rotated about the orbital path 26, the pipe contact member 8 will follow an orbital path (not shown) about the inner perimeter of the wall of the pipe 24. The direction of the orbital path followed by the contact member 8 is the same direction as the orbital path followed by the shaft 4. However, the position of the shaft 4 and the pipe contact member 8 will be diametrically opposed, since the axis of symmetry of the shaft and the contact member 8 passes through the axis of symmetry of the blade 18. The trace of the orbiting shaft 4 will describe a cone, as will the trace of the contact member 8. The cone described by the trace of the latter is inverted relative to the former.

When the shaft 4 follows the orbital path 26, the blade 18 will "wobble" about its axis, much as a top "wobbles". The resultant cut produces an upwardly and outwardly facing (relative to the pipe interior) beveled surface on that part of the pipe 24 remaining after the protruding stub has been cut off. This beveled surface presents a good connecting surface for offset flanges and the like to the pipe 24. A complementary beveled surface facing downwardly and inwardly (relative to the pipe interior) is introduced into that portion of the pipe that is cut off and discarded.

An interesting and highly novel feature of the invention lies in its capability to cut any desired minimum length of pipe, even when only one end of the pipe is available for insertion of the cutter 2. This feature is achieved by the relative position of the pipe contact member 8 being spaced downwardly from the blade 18.

In the earlier devices, none of which contain the type of contact member 8 disclosed herein, the stability means are provided upwardly of the cutting blade. Thus, the blade must be inserted into the pipe a substantial distance before a cut can be made.

An alternative embodiment, not shown, comprises a shaft member having the major portion of its lower half threaded. Its upper half, which is not threaded, has a hexagonal cross-section to provide a suitable gripping surface for a wrench. The cutting blade is held in position on the threaded portion of the shaft by virtue of its sandwiched position relative to a pair of opposed lock washers. The upper lock washer, in a commercial embodiment, serves the additional function of providing restraining means to prevent the blade from continuing to advance once it has cut through the walls of the pipe. The edges of this lock washer/restraining member are rounded to avoid slashing the pipe walls. The lower lock washer is tightened by means of a nut, which is easily tightened by use of a suitable implement, when the hexagonal shaft is held in position by another suitable implement.

Another alternative embodiment, not shown, comprises the first embodiment and a restraining disc having rounded edges and concentrically mounted on a surface of the cutting blade. The restraining disc has a radius approximately one-pipe-wall-thickness less than the radius of the cutting blade, thereby restraining the cutting blade from penetrating the pipe wall farther than necessary to cut completely through the wall. In this particular alternative embodiment, the diameter of the shaft is approximately ½". The lowermost extremity of the shaft is not threaded, and is tapered to a diameter of about ⅜". An oil impregnated brass bushing having an outer diameter of ¾" and an inner diameter of ⅜" is adapted to receive the ⅜" portion of the shaft. The bushing is received, by means of a press fit, into a disc-shaped pipe contacting surface of the disc is spherical, to allow the device to wobble as the orbital motion is applied to the shaft during the pipe cutting operation.

The shaft extends completely through the bushing and is prevented from withdrawing therefrom by means of a lock washer encircling the protruding portion of the shaft and a cotter pin which extends therethrough. Another lock washer, held in place by a castle nut and a cotter pin extending therethrough, is disposed on the upper surface of the disc to complete the securing of the disc to the shaft. The bushing protrudes slightly from the upper and lower horizontal planes of the disc, thereby decreasing the friction between the rotating upper and lower washers and the non-rotating disc-shaped guidance member.

The cutting blade and its associated penetration/restricting member, in this embodiment, are spaced upwardly from the disc-shaped pipe contact member by a distance of approximately 4".

Second Embodiment

FIGS. 3-6 show the second embodiment exemplary of the present invention.

For purposes of illustration, it will be assumed that it is desired to cut the pipe 60 in the plane 62.

Inserted into the pipe is the second embodiment, generally designated 30.

An elongate shaft, generally designated 32, is shown to comprise four regions, a minor unthreaded region 34, a major unthreaded region 32a, a threaded region 54, and a unthreaded bearing region 36, together with an annular groove 38 in region 36, such groove to accept a restraining clip.

A disc-shaped pipe contacting member, or guidance member, 35 is shown journalled onto the unthreaded bearing region 36 of the shaft 32. The contacting member comprises two rubber discs 35a and 35b, each cut from rubber sheet and glued together so as to form a disc of sufficient thickness. The disc has a central axial hole to accept oil-impregnated, flanged bushings 40 and 42. The journalling means comprises the two non-rotating bushings 40 and 42 and the rotating bearing region 36 of the shaft 32. One of the bushings 40 and 42 is pressed into each end of the central axial hole in the rubber disc so that each bushing's flange 44 is flush with a planar surface of the disc. The inside bearing surfaces of bushings 40 and 42 make contact with the bearing region 36. A restraining clip 46 snaps into the groove 38, thereby preventing the contacting member 35 from disengaging with the bearing region 36 when the shaft is rotated relative to the contacting member.

A circular cutting blade 48 has a centrally disposed aperture formed therein to receive shaft 32 and is sandwiched between locking nuts 56 and 58 located on the threaded region 54 of shaft 32. Locking nuts 56 and 58 each has a locking surface which engages the cutting blade so that vibrational loosening of the nuts will be prevented. The cutting blade 48 is thus held tightly between nuts 56 and 58 and rotates with the shaft 32. Optionally, support washers 50 and 52 may be inserted between the cutting blade and the locking nuts thereby providing additional support for the cutting blade.

When it is desirable to replace the cutting blade 48, first the clip 46 is removed, next the contact member 35 is removed, then nut 56 may be removed because the diameter of the bearing region 36 is smaller than that of the threaded region 54. Once locking nut 56 has been removed, the cutting blade 48 can be replaced.

The cutting blade 48 comprises a circular disc which has been coated on the outside edge with abrasive bits 49, and has a diameter slightly less than that of the pipe to be cut. Such blades are commercially available from Remington.

A hand-held power drill 6 is partially shown with a chuck 7 which receives the minor unthreaded region 34 of the shaft 32.

When the power drill 6 is activated, the shaft 32 and the blade 48 mounted thereon rotate in the known main manner. However, the pipe contacting member 35 will not rotate, because of its journalled relationship to the shaft 32.

The method of using the pipe cutter 30 contemplates the introduction of the pipe cutter assembly into the interior of a pipe 60. The blade 48 is aligned with the desired cutting plane 62 and the power drill 6 is activated. The shaft 32 is then tilted from its initial orientation parallel to the longitudinal axis of the pipe so that the blade 48 will attack and abrade an arcuate portion of the wall of the pipe 60 until the blade 48 completely cuts therethrough. Having thus accomplished the initial cut the shaft 32 is then orbited about the longitudinal axis of the pipe. This orbital motion is shown by the arrow 64. It will be understood that the direction of orbit may depend upon the angular direction of the rotating shaft 32.

The function of the pipe contact member 35 is to hold or stabilize the pipe cutter assembly 30 as the initial cut is made and as the orbital path 64 is followed. As the shaft 32 is tilted from its original orientation (parallel to the longitudinal axis of the pipe) to a point on the orbital path 64 to begin the pipe-cutting operation, the contact member 35 will make contact with the interior wall of the pipe 60 at essentially two points 66 and 68; this results because the diameter DCM of the contact member is made slightly less than the interior diameter of the pipe, but the diagonal distance D through the contact member exceeds the inside diameter of the pipe. As the orbital path 64 is followed, the contact points 66 and 68 each traces out a circle on the interior wall of the pipe 60. It will be understood that the contact between the pipe 60 and the pipe contact member 35 will allow the user of the device to firmly press the contact member 35 into that portion of the wall of the pipe 60 opposing that portion of the wall being cut by the blade 48; this pressing of the contact member 35 occurs at point 66. It is therefore understood that the shaft 32 is elongated not only to increase the distance to which the blade may be inserted into the pipe, but to provide leverage as well.

The blade 48, when it is imbedded into the pipe 60, acts as a fulcrum of a lever. Thus, when the shaft 32 is rotated about the orbital path 64, the pipe contact member 35 will follow an orbital path (not shown) about the inner perimeter of the wall of the pipe 60. The direction of the orbital path followed by the contact member 35 is the same direction as the orbital path followed by the shaft 32; however, the position of the shaft 32 and the pipe contact member 35 will be diametrically opposed, since the axis of the symmetry of the shaft and the contact member passes through the axis of symmetry of the blade 48. The trace of the orbiting shaft 32 will describe a cone with a vortex at the center of the contact member 35.

A table of the various dimensions of the pipe cutter for various size pipes are shown in the following table:

| PIPE DIAMETER | | | |
| --- | --- | --- | --- |
| | 2 inches | 3 inches | 4 inches |
| Cutter Dimension (Approx.) | | | |
| CD (chuck diameter) | 3/8 | 3/8 | 3/8 |
| SD (shaft diameter) | 3/8 | 1/2 | 1/2 |
| DC (diam. cutting blade) | 1 3/4 | 2 15/16 | 3 15/16 |
| DCM (diam. contact member) | 1 7/8 | 2 15/16 | 3 15/16 |
| T (thickness of contact member) | 3/4 | 1 | 1 |
| SL (shaft length) | 9 1/2 | 12 | 12 |
| S (spacing between contact member and cutting blade) | 3 | 3 | 3 |

Yet another embodiment (not shown) contemplates the provision of a sleeve member adapted to be fitted snugly into the pipe 24 when the blade 18 is inserted into the cutting position. The sleeve member has a pocket therein adapted to receive a spherical ball journalled to the lowermost end of the shaft 4. In this manner, a ball socket joint is formed. Rotation of the drill 6 about the orbital path 26 causes the ball socket to pivot within the sleeve member, thereby guiding the blade 18 in its cutting operation.

The cutters described herein and the method of using the same will effectively cut PVC (polyvinylchloride) pipe as well as copper pipe. The tools have a good "feel" and can, therefore, be used by anyone regardless of the level of applicable skill possessed by the user.

Although particular embodiments of the invention has been shown and described in full here, there is no invention to thereby limit the invention to the details of such embodiments. On the contrary, the intention is to cover all modifications, alternatives, embodiments, usages and equivalents of the subject invention as fall within the spirit and scope of the invention, specification and the appended claims.

I claim:

1. A pipe cutter, comprising, in combination,
   an elongate shaft,
   a guidance member centrally and rotatably secured to one end of said shaft,
   a disc-shaped cutting blade mounted on said shaft so that the longitudinal axis of the shaft is perpendicular to the plane of the cutting blade and passes through the center of the cutting blade,
   power tool means for imparting a rotational torque to said shaft at the end of the shaft remote from the guidance member,
whereby the power tool causes said shaft and cutting blade to rotate about the longitudinal axis of the shaft while the cutting blade cuts a pipe as constrained by the guidance member against the inner walls of the pipe when the longitudinal axis of the shaft is constrained to precess about the longitudinal axis of the pipe in an orbital motion.

2. In the pipe cutter of claim 1,
   means for journalling said guidance member to one end of said shaft,
whereby the rotation of the shaft and cutting blade is independent of any rotation of said guidance member.

3. In the pipe cutter of claim 1,
   means for restraining said cutting blade from contacting material surrounding an embedded pipe.

4. In the pipe cutter of claim 3,
   said means comprising a disc-shaped penetration-limiting member mounted on said shaft in encircling engagement therewith and radially disposed therein,
   said penetration-limiting member having a diameter less than that of the cutting blade,
   said diameter proportioned to expose a portion of said cutting blade sufficient to cut said pipe,
   said diameter proportioned to restrict the advance of said cutting blade when said pipe has been completely cut therethrough.

5. In the pipe cutter of claim 4,
   said penetration-limiting member having rounded edges for inhibiting the cutting of the pipe by said penetration-limiting member.

6. In the pipe cutter of claim 1,
   said guidance member having a cup member in encircling engagement therewith,
   said cup member having outwardly extending walls for receiving swarf therein.

7. In the pipe cutter of claim 1,
   said guidance member having an encircling channel integrally formed therein,
   said channel having a generally upwardly facing mouth for receiving swarf therein.

8. In the pipe cutter of claim 1,
   said guidance member comprises a generally disc-shaped body.

9. In the pipe cutter of claim 1,
   said guidance member having a generally pear-shaped configuration.

10. In the pipe cutter of claim 1,
    wherein an abrasive material is coated on the pipe contacting surfaces of said cutting blade.

11. In the pipe cutter of claim 10, wherein said abrasive material comprises tungsten carbide bits.

12. A tool for cutting a pipe from the inside, comprising:
   (a) an elongate shaft with an upper end region and a lower end region, said upper end region cylindrical and designed to fit removably but retentively in the chuck of a hand held power drill;
   (b) a pipe contacting member centrally and rotatably attached to said lower end region, said contacting member dimensionally characterized by:
      (1) the contacting member diameter measured in a direction perpendicular to said shaft is slightly less than the inside diameter of said pipe, and
      (2) the contacting member diameter measured in a direction somewhat tilted from perpendicular to said shaft is slightly greater than the inside diameter of said pipe; and
   (c) a cutting blade centrally attached to said shaft between said upper and lower end regions, said blade dimensionally characterized by the blade diameter is slightly less than the inside diameter of said pipe;
   whereby said tool may be inserted lower end region first into a pipe by maintaining said shaft coaxial with said pipe and then may be tilted out of coaxiality so as to have said contacting member engage said pipe on opposite sides simultaneously and to have said cutting blade engage said pipe.

13. The tool of claim 12, wherein said contacting member is non-expandable so that contact with said pipe on opposite sides simultaneously may only occur if said shaft is not coaxial with said pipe.

14. The tool of claim 12, wherein said contacting member is a thick disk coaxial with said shaft.

15. The tool of claim 12, wherein said cutting blade is a circular disk.

16. The tool of claim 15, wherein said cutting blade's cutting surface comprises abrasive bits coated on the edge region of said circular disk.

17. The tool of claim 12, wherein said cutting blade is non-expandable so that contact with said pipe may occur only if said shaft is not coaxial with said pipe.

18. The tool of claim 12, wherein said cutting blade is retentively but removably attached to said shaft.

19. The tool of claim 12, wherein said cutting blade is attached to said shaft closer to said lower end region than to said upper end region,
   whereby tilting said tool when inserted lower end region first into a pipe from a coaxial position by a force applied to said upper end region causes said cutting blade to engage said pipe with at least double said force because of leverage.

20. The tool of claim 12, wherein said shaft between said attached cutting blade and said upper end region is characterized by a lack of any substantial attachments or projections.

21. A method of cutting a pipe from the inside, comprising the steps of:
   (a) providing a shaft having an upper end region and a lower end region,
   (b) providing a pipe contacting member rotatably attached to said lower end region, said contacting member dimensionally characterized by:
      (1) the contacting member diameter measured in a direction perpendicular to said shaft is slightly less than the inside diameter of said pipe, and
      (2) the contacting member diameter measured in a direction somewhat tilted from perpendicular to said shaft is slightly greater than the inside diameter of said pipe,
   (c) providing a circular cutting blade centrally attached to said shaft between said upper and lower end regions,
   (d) connecting said upper end region to a hand held rotary power source,
   (e) inserting said shaft lower end region first into said pipe a distance so that said cutting blade is near the portion of said pipe which is to be cut,
   (f) activating said rotary power source so as to rotate said shaft and cutting blade,
   (g) manually adjusting and tilting said shaft so that said cutting blade engages and begins to cut that portion of said pipe which is to be cut and that concurrently said contacting member contacts said pipe on opposite sides simultaneously and thereby provides a fulcrum for leveraging the manual tilting force into a cutting force,
   (h) manually applying an orbital motion to said shaft to complete cutting that portion of said pipe to be cut.

* * * * *